Nov. 4, 1958  R. E. FLEMING ET AL  2,858,865
MUSHROOM TRIMMING MACHINE
Filed Dec. 29, 1954  3 Sheets-Sheet 1

INVENTORS
Raymond E. Fleming
Edson S. Harris, Jr.
Dexter Mead.
BY
Munn, Liddy, Nathanson + March,
ATTORNEYS Nov. 4, 1958  R. E. FLEMING ET AL  2,858,865
MUSHROOM TRIMMING MACHINE
Filed Dec. 29, 1954  3 Sheets-Sheet 2
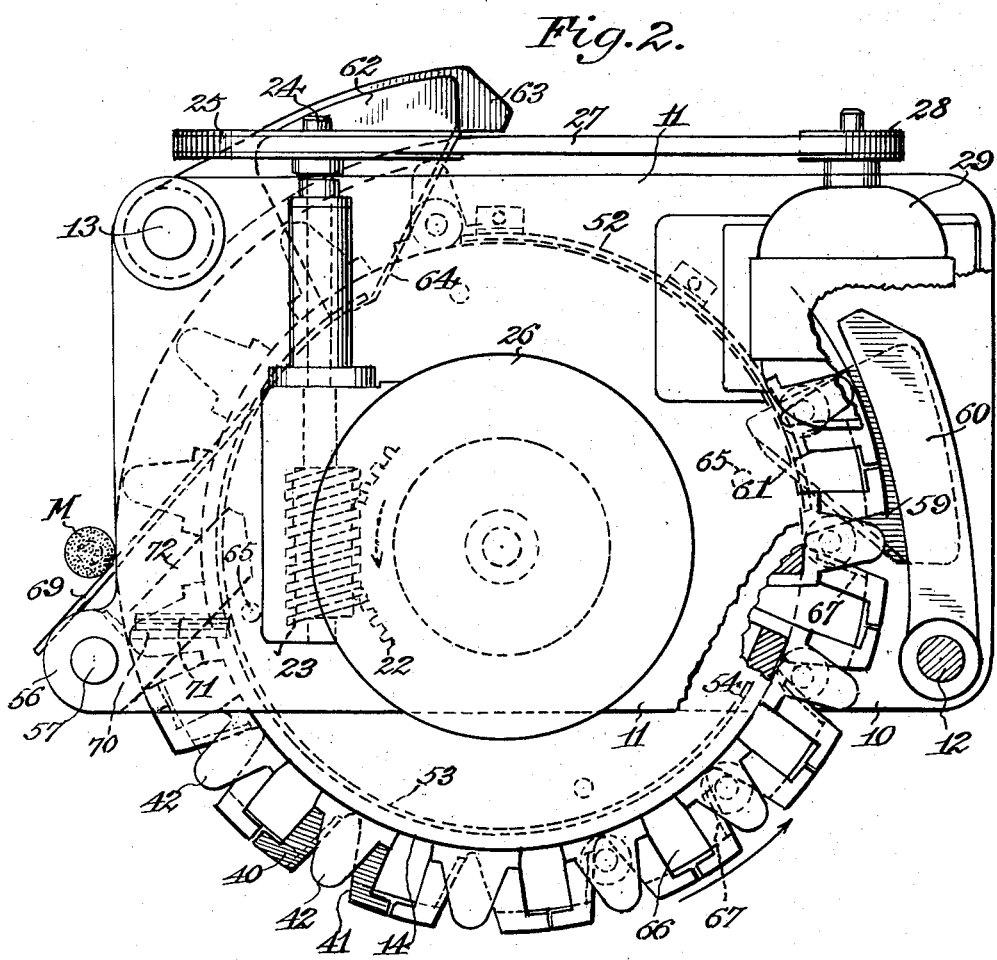
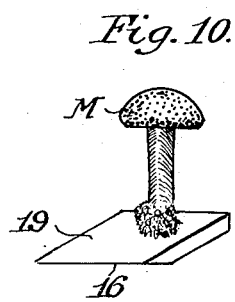
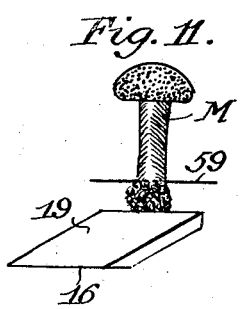
INVENTORS
Raymond E. Fleming
Edson S. Harris, Jr.
Dexter Mead.
BY
Munn, Liddy, Nathanson & March
ATTORNEYS Nov. 4, 1958    R. E. FLEMING ET AL    2,858,865
MUSHROOM TRIMMING MACHINE
Filed Dec. 29, 1954    3 Sheets-Sheet 3
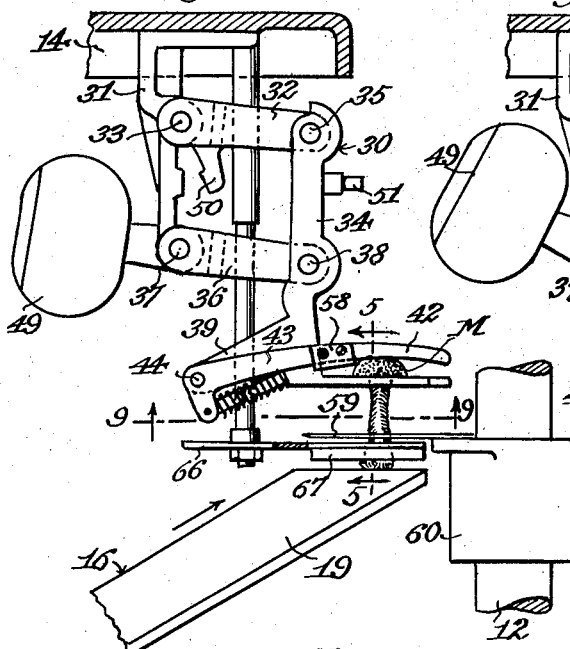
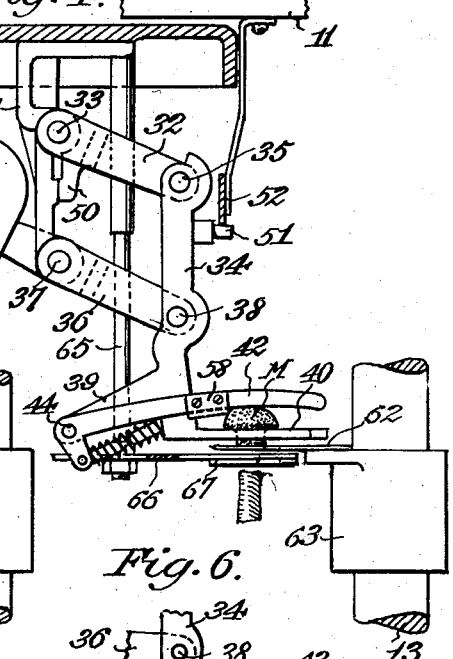
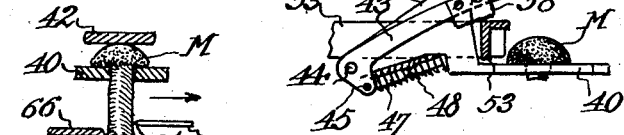
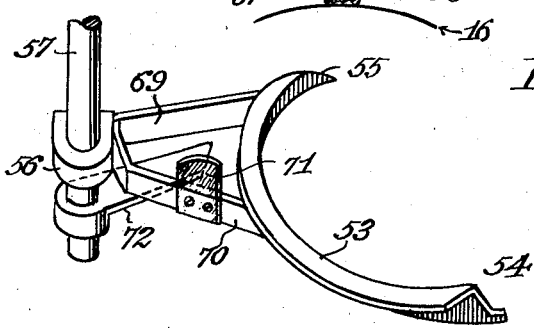
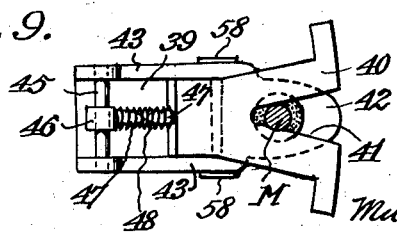
INVENTORS
Raymond E. Fleming,
Edson S. Harris, Jr. and
Dexter Mead.
BY
Munn, Liddy, Nathanson & March,
ATTORNEYS

United States Patent Office 2,858,865
Patented Nov. 4, 1958

2,858,865

MUSHROOM TRIMMING MACHINE

Raymond E. Fleming, Philadelphia, Edson S. Harris, Jr., Moylan, and Dexter Mead, West Chester, Pa., assignors to Grocery Store Products Co., West Chester, Pa., a corporation of Delaware Application December 29, 1954, Serial No. 478,236

14 Claims. (Cl. 146—81)

This invention relates to a machine for carrying out cutting or trimming operations on articles one at a time in the preparation of a marketable product, the said machine being one which may be used advantageously for cutting mushrooms wherein the dirt laden root portion of the stem of each mushroom is severed first and then the remaining edible portion of the stem is severed from the edible crown or button of the mushroom.

Among the advantages and benefits of the machine of the present invention when used for cutting mushrooms are the following. A plurality of traveling individual holding devices is provided so that one mushroom is held by each of said devices in such manner that there is no motion of the mushroom relative to the device holding the same. The mushroom is positively held steady and kept from tilting thereby avoiding shearing of the stem at the sides. The parts of each of said holding devices are counterbalanced for gentle but positive operation in the movement of each mushroom for the cutting operations. The root end or dirt portion of each mushroom is severed first for disposal from the machine immediately with the result that the machine will not become clogged and fouled with dirt. Predetermined portions are cut from each mushroom with any desired portion of the stem remaining with the crown or button regardless of the overall stem length and diameter. The length of the root end portion to be severed may be varied according to the overall root length of mushrooms from crops grown in different seasons. All working parts of the machine are located above the path of travel of the mushrooms.

The present invention also resides in the general improved construction, operation and efficiency of a machine of the indicated character.

Other objects and advantages of this invention will appear when the following description is read in conjunction with the accompanying drawings in which:

Fig. 1 is a side elevational and part sectional view of a machine embodying the present invention, and wherein only two of the mushroom holding devices are shown for the sake of clearness, said holding devices being disposed diametrically opposite each other, the one at the left being in its lowered mushroom receiving position and the one at the right being in its raised position for the first cutting operation.

Fig. 2 is a top plan view, portions being broken away to show certain underneath features.

Fig. 3 is an enlarged vertical sectional view in which one of the holding devices is shown raised by the cooperative action of the rotatable cam disk and the stem of a mushroom held in the device and about to be cut to sever the root or dirt end portion.

Fig. 4 shows the holding device advanced on its circular path, but lowered for the second cutting operation in which the remaining portion of the mushroom stem is severed from the crown.

Fig. 5 is a detail sectional view taken on the line 5—5 of Fig. 3 looking in the direction indicated by the arrows.

Fig. 6 is a fragmentary side view showing one of the mushroom clamping members in its raised receiving position.

Fig. 7 is a fragmentary perspective view showing certain features.

Fig. 8 is a perspective view of one of the holding devices, portions being broken off.

Fig. 9 is a sectional view taken on the line 9—9 of Fig. 3 looking in the direction indicated by the arrows.

Figure 1:
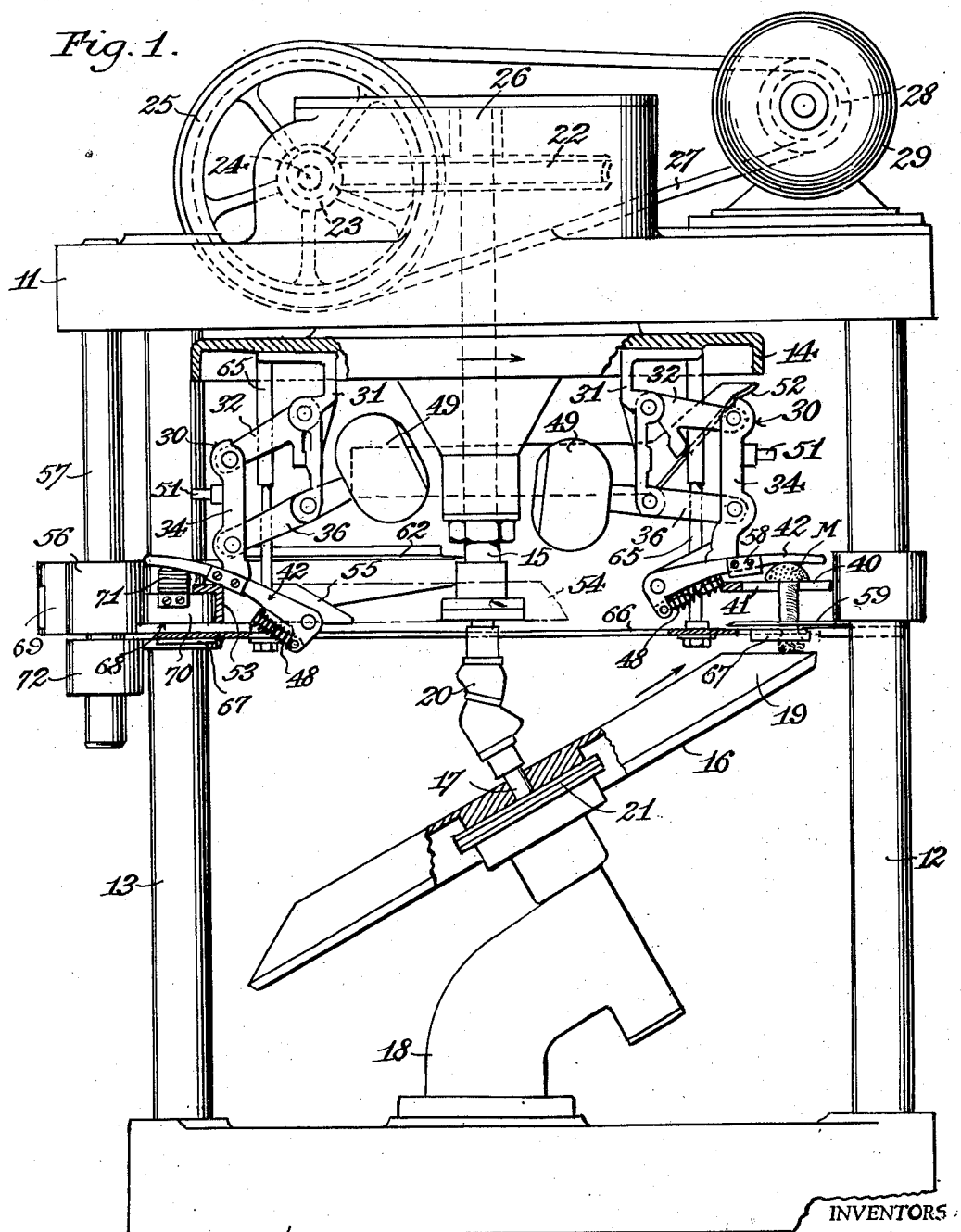

Fig. 10 illustrates the position of a mushroom as it is being hand fed. Fig. 11 illustrates the root end severing position of the mushroom. Fig. 12 illustrates the remaining stem portion and crown severing position of the mushroom during the operation of the machine.

As shown in the drawings, the machine includes a stationary supporting structure comprising a base plate 10 and a top plate 11 supported by pillars or columns 12 and 13 rising vertically from the base plate 10.

A rotor or turret 14 in the form of a flanged disk is secured to a spindle 15 mounted in a suitable bearing carried by the top plate 11 so that the turret is rotatable on a vertical axis. The turret is disposed in close proximity to the top plate 11 below the latter.

Arranged below the turret 14 is a beveled disk 16 which is secured to a shaft 17 mounted for rotation on an oblique axis in a bearing 18 fixed to the base plate 10 on the top of the latter. The disk 16 is therefore disposed obliquely with respect to the vertical axis of the spindle 15, and at such an angle that its highest point is directly below the knife 59, and the circular bevel of the disk 16 serves as a circular cam surface 19 which at its highest point parallels a horizontal plane during the rotation of the disk 16. In order to cause the disk 16 to rotate in response to the rotation of the spindle 15 and the turret 14 in the same direction and at the same rate of speed, the shaft 17 is operatively connected with the spindle 15 by means of a double universal joint unit 20. The vertical distance between the cam surface 19 and the knife 59 may be adjusted by changing the position of the disk 16 on the shaft 17. This may be accomplished by the use of a suitable number of shims 21 interposed between the disk 16 and the bearing 18. The spindle 15 is driven by any suitable power and motion transmission means on the top plate 11. In the present instance use is made of a worm wheel 22 fast on the spindle 15. A worm 23 meshes with the wheel 22. The worm 23 is fast on the shaft 24 of a pulley 25. The shaft 24 is supported by a bearing on a housing 26 which encloses the worm wheel and the worm. A belt 27 encircles the pulley 25 and a pulley 28 fast on the shaft of an electric motor 29.

Use is made of a plurality of individual holding devices 30 carried by the turret 14 so as to travel therewith beneath it in a circular path with respect to its rotational axis. While the devices 30 in the present instance are used for holding an edible product, namely a mushroom to be operated upon or be cut, it will be obvious that other articles may be held by said devices 30. In the present instance use is made of fifteen holding devices 30 although any other number of them may be used. The devices 30 are spaced equidistantly with respect to each other and circumferentially with respect to the turret 14. The devices 30 are similar in construction and operation, therefore the following description of one of them will suffice for all of them. A bracket 31 is attached to the turret 14 at the underside thereof. The holding device has an upper link 32 one end of which is pivotally connected with the bracket 31, as at 33, and the other end of the link is pivotally connected with a head 34, as at 35. The head 34 is rectangular when viewed broadside and L shaped in profile. A lower link 36 has one end pivotally connected with the bracket 31, as at 37, and the other end of the link 36 is pivotally connected with the head 34, as at 38. The head 34 has an arm 39 projecting laterally inward therefrom toward the axis of the spindle 15. A plate 40 is attached to the head 34 on its lower end. The plate 40 projects laterally outward and is disposed horizontally so as to travel above the cam surface 19 in close proximity thereto. The plate 40 has a V shaped notch 41 therein. A mushroom M may be placed on the plate 40 by moving the mushroom upright by hand laterally inward with respect to the notch 41, so that the crown or button of the mushroom rests upon the plate 40 with the stalk or stem of the mushroom disposed in the notch 41 extending downwardly as shown. A clamping member 42 is connected with the arm 39 of the head 34. The clamping member 42 is bifurcated to accommodate the head 34. The arm 39 is disposed between the furcations 43 which are pivotally connected with the arm 39, as at 44. Thus the clamping member 42 as a part of the holding device has pivotal movement on a horizontal axis with respect to the plate 40 so as to clampingly cooperate therewith. In doing so the clamping member 42 is engageable with and disengageable from the crown of the mushroom. The furcations 43 carry a pin 45 arranged transversely between them. The pin 45 has a block 46 integral therewith. Pins 47 are fixed on the block 46 and the head 34 respectively, opposite each other. A helical compression spring 48 surrounds the pins 47 with its opposite ends respectively bearing on the block 46 and the head 34. The spring 48 yieldingly urges the clamping member 42 into a clamping position for the stated purpose. A counterbalance weight 49 is attached to the link 36. The total weight of the parts 32—48 constituting the holding device is in preponderance of the weight 49 to such degree that the holding device is automatically movable downwardly gently into a lowered position, and easily movable upwardly into a raised position by means and in a manner to be explained hereinafter. A lug 50 on the link 32 engageable with the bracket 31 limits the downward movement of the holding device into its lowered position. The head 34 has a laterally projecting pin 51 which encounters a cam 52 attached to the top plate 11 at the underside thereof. The pin 51 and cam 52 cooperate in the rotation of the turret 14 to assure the return movement of the holding device into its lowered position.

In order to operate the clamping member 42 during the rotation of the turret 14 so that the clamping member is raised into its unclamping or releasing position to remain therein for a certain period of time and then is lowered into its clamping position by the action of the spring 48 to remain in the clamping position for a certain period of time per revolution of the turret 14, there is provided an arcuate cam track 53 with sloping end portions 54 and 55 respectively. The track 53 is attached to a bracket 56 fixed to a vertical rod 57 depending from the top plate 11. The track 53 is concentric to the axis of the turret 14. The clamping member 42 has replaceable wear pieces 58 which ride on the track 53 in the operation of the clamping member in the manner and for the purpose described hereinabove.

A knife or cutter 59 is attached to a bracket 60 fixed on the column 12. The knife 59 is stationary and disposed horizontally with its cutting edge 61 extending tangentially with respect to the circular path traversed by a mushroom clamped in the holding device. A second knife or cutter 62 is attached to a bracket 63 fixed on the column 13. The knife 62 also is stationary and disposed horizontally with its cutting edge 64 extending tangentially with respect to said circular path. The knives 59 and 62 are angularly spaced from each other with respect to the turret axis, and are approximately at the same elevation in the circular path of travel of the stalks or stems of the mushrooms.

The cam track 53 is so arranged that the sloping end portion 54 is adjacent the knife 59 and the sloping end portion 55 is adjacent the knife 62. The arrangement is such that the clamping member 42 moves into its clamping position with respect to the related notched plate 40 to clampingly engage the crown of the mushroom and hold it on the plate 40 prior to the cutting action of the knife 59 in the rotation of the turret 14; and by virtue of the sloping end portion 55 the clamping member 42 is moved upwardly out of engagement with the crown of the mushroom after the cutting action of the knife 62.

Rigid rods 65 depending from the turret 14 have attached to their lower ends a horizontally disposed circular plate 66 having notches and lips 67 corresponding in number and position to the notched plates 40. The plate 66 lies above the disk 16 in spaced relation to the cam surface 19 and in close proximity to the knives 59 and 62 below the latter. The lips 67 respectively at the trailing edges of the notches 41 serve as backing means to assure a horizontal cut by the knives 59 and 62 crosswise of the mushroom stem.

A deflector 69 is attached to the cam track 53 and bracket 56 depending from the top plate 11. A support 70 which is a part of the bracket 56 has attached thereto an upright piece of resilient sheet material constituting a wiper 71 having a top convex edge. The deflector 69 removes the mushroom crown from the plate 40, and the wiper 71 cleans the under surface of the clamping member 42 during the rotation of the turret 14. A scraper 72 on upright rod 57 serves for removing dirt from the under surface of the plate 40.

The operation of the machine is as follows. The mushrooms are hand fed to the notched plates 40 of the holding devices 30 in succession at the loading station of the machine while the driven turret 14 causes the devices 30 to travel in a circular path and the disk 16 is in motion. The clamping members 42 operating in timed accord clamp the mushrooms to the plates 40 by engaging the crowns of the mushrooms respectively, thereby preventing upward and canting movement of the mushrooms relative to their respective holding devices as illustrated in Figs. 3 and 4. In the travel of the holding devices the dirt or root ends of the mushroom stems encounter the cam surface 19 of the disk 16 in succession causing the devices 30 together with the mushrooms held thereby to move upwardly into a raised position whereupon the root ends are severed from the stems by the knife 59 and drop by gravity into a chute (not shown). The amount of root end removed is determined by the vertical distance between the highest point of the cam surface 19 and the knife 59 and can be adjusted by the use of shims 21 as previously described. After the root end severing operation the mushrooms are no longer under the upward thrusting or camming action of the disk 16, therefore the holding devices 30 together with the mushrooms in succession automatically move downwardly into a lowered position whereupon the remaining portions of the stems are severed from the crowns one at a time by the knife 62, as illustrated in Fig. 4. These stem portions drop by gravity into a chute (not shown). Subsequently in the next increment of movement of the holding devices 30 the clamping members 42 in succession are elevated by the end portion 55 of the cam track 53 whereupon the mushrooms crowns as they arrive are deflected from the plates 40 by the deflector 69 into a chute (not shown). The clamping members 42 are wiped clean by the wiper 71 and remain elevated by the upper horizontal surface of the cam track 53 until they pass the loading station and reach the end portion 54 enabling the clamping members 42 in succession to again move into their lowered clamping position for a repetition of the described operation. It is obvious that the scraper 72 cleans the under surface of the plates 40 and that the pins 51 and cam 52 assure the return movement of the holding devices 30 to their lowered position in the operation of the machine.

It also will be appreciated from the foregoing that all of the mentioned objects and advantages of the invention are attained, especially the improved productive capacity of a machine which is kept clean and prevented from becoming clogged and fouled with dirt due to the location of the main working parts above the path traversed by the mushrooms.

It is to be understood the invention is not restricted to the embodiment thereof illustrated and described, and that details of construction may be modified and rearranged in accordance with the scope of the invention as defined in the appended claims.

We claim:

1. In a machine of the character described, the combination of a turret rotatable on a vertical axis, article holding devices for fixedly gripping and holding articles; means mounting said devices on said turret in circumferentially spaced relation for up and down vertical movement, each holding device having limited down movement under the action of gravity, a cam disk rotatable on an inclined axis and disposed below said turret and holding devices, said cam disk acting on the articles respectively held by said devices in succession in response to the rotation of the turret causing each article together with its holding device to move upwardly into a predetermined raised position, and a stationary knife in the path of travel of articles carried by said holding devices which cuts off the lower end portion of each article in response to the rotation of the turret.

2. In a machine as set forth in claim 1, wherein said cam disk enables each of said holding devices together with the article held thereby in due order to move downwardly into its lowered position, and a second stationary knife in the path of travel of the articles in the holding devices when the same are lowered, which cuts off another portion of each article in response to the rotation of the turret.

3. In a machine as set forth in claim 2, wherein said knives are angularly spaced with respect to each other about said vertical axis and also disposed at relatively different positions of elevation with respect to said vertical axis.

4. In a machine of the character described, the combination of a rotor rotatable on a vertical axis, a device for holding an article to be operated upon, said device being connected with and depending from said rotor to move therewith means mounting said device on the rotor to be movable up and down with respect thereto, the down movement of said device being by gravity action, means limiting the down movement of the device, means disposed below said rotor and depending device, responsive to the rotation of said rotor causing the up movement of said device by the article held in the device encountering said last means in response to the rotation of the rotor, said device including a notched plate serving as a support for an article when the latter is manually engaged therewith, and means providing a downwardly facing abutment which cooperates with said notched plate to clampingly hold said article in said device.

5. In a machine as set forth in claim 4, wherein said last mentioned means consists of a spring actuated pivoted clamping member having a broad clamping surface cooperable with said notched plate.

6. In a mushroom cutting machine, the combination of a turret rotatable on a vertical axis, a plurality of mushroom holding devices depending from said turret so as to travel therewith in a circular path means mounting said holding devices on the turret for vertical movement; a cam means engageable with mushrooms carried by said holding devices, causing said devices to be movable into a raised position and a lowered position in succession during one lap of said path, said cam means being disposed below said turret and being responsive to the rotation of said turret whereby it cooperates with one mushroom at a time thereby moving its device together with the mushroom into a raised position so that the stem root portion of the mushroom may be severed and then enables the device together with the mushroom to move by gravity into a lowered position so that the remainder of the stem may be severed from the crown of the mushroom, and knives which respectively sever said root portion and the remaining stem portion of the mushroom wherein the root portion is severed first and then the remaining stem portion.

7. In a mushroom-trimming machine of the character described, the combination of a rotor rotatable on a vertical axis, a bracket depending from said rotor, a head, mushroom holding and releasing clamp means on said head, holding the crowns of mushrooms fixedly in said head with the stems extending downward, links pivotally connected with said bracket and head whereby the head is movable up and down so that the mushroom holding and releasing means may be elevated into a raised position and fall by gravity into a lowered position, and rotary cam means drivingly connected with said rotor and disposed below said heads, which acts on the stem of a mushroom held in said holding and releasing means, causing the up and down movement of the head together with the holding and releasing means and the mushroom held therein, so that the mushroom is alternately held in a raised position and a lowered position.

8. In a machine of the character described as set forth in claim 7, and a counterweight connected with one of said links to balance the total weight of said head, holding and releasing means and links.

9. In a machine of the character described as set forth in claim 7, wherein said holding and releasing means comprises a plate on said head extending laterally therefrom, said plate having a notch therein to accommodate a mushroom to be operated on, and a spring actuated clamping member operatively connected with said head which cooperates with said plate to hold the mushroom on the plate.

10. In a machine of the character described as set forth in claim 7, and means on one of said links which cooperates with said bracket to limit the downward movement of the head and the holding and releasing means, so that said mushroom assumes a predetermined lowered position.

11. In a machine of a character described, the combination of a rotatable turret, devices depending from said turret in circumferentially spaced relation with respect to each other; means mounting said devices for vertical movement on the turret, each of said devices having crown-engaging and-clamping means for holding a mushroom upright with its crown uppermost, said crown-engaging and-clamping means including a spring-actuated pivoted clamping member which engages the crown of the mushroom and an arcuate cam track with sloping end portions disposed below said turret, depending devices and clamping members and which causes pivotal movement of said clamping member into a raised unclamping position and holds it therein for a certain interval and then enables pivotal movement of the clamping member into a lowered clamping position to engage the mushroom crown during one complete revolution of said turret, each of said depending devices having both up and down movement; and lifting means below said turret, causing the up movement of the devices by mushrooms held in the devices as the mushrooms encounter said lifting means in response to the rotation of the turret, the down movements of each device being caused by gravity action.

12. In a machine of a character described, the combination of a rotatable turret, devices depending from said turret in circumferentially spaced relation with respect to each other; means mounting said devices for vertical movement on the turret, each of said devices having crown-engaging and-clamping means for holding a mushroom upright with its crown uppermost, said crown-engaging and-clamping means including a spring-actuated pivoted clamping member which engages the crown of the mushroom, and an arcuate cam track with sloping end portions disposed below said turret, depending devices and clamping members and which causes pivotal movement of said clamping member into a raised unclamping position and holds it therein for a certain interval and then enables pivotal movement of the clamping member into a lowered clamping position to engage the mushroom crown during one complete revolution of said turret; stationary cutters angularly spaced about the axis of the turret, which sever stem portions one above another from a mushroom held in each of said holding means; and means which removes the mushroom crown from said holding means in response to the rotation of the turret.

13. In a machine of the character described, the combination of a rotatable turret, devices depending from said turret in circumferentially spaced relation with respect to each other; means mounting said devices for vertical movement on the turret; counterbalance means continuously applying an upward force to said depending devices, said upward force being insufficient to cause upward movement of the devices; cam means adapted to effect positive downward movement of said devices at a point in their path of movement with the turret and in response to rotation of the turret, each of said devices having crown-engaging and-clamping means comprising upper and lower members for holding a mushroom upright with its crown uppermost, said crown-engaging and-clamping means including a spring and said upper member being actuated by said spring and constituting a vertically, pivotally movable clamping member which engages the crown of the mushroom; and an arcuate cam track with sloping end portions disposed below said turret, depending devices and clamping members and which engages and causes vertical pivotal movement of said upper clamping member into a raised unclamping position and holds it therein for a certain interval and then enables downward pivotal movement of the clamping member into a lowered clamping position to engage the mushroom crown during one complete revolution of said turret.

14. In a machine as set forth in claim 13, and means in the path of travel of said upper, pivotally movable clamping member about the rotational axis of the turret which cleans the clamping surface of the clamping member in response to the rotation of the turret.

References Cited in the file of this patent

UNITED STATES PATENTS

| | | |
|---|---|---|
| 2,284,647 | Ewald | June 2, 1942 |
| 2,431,320 | Fischer | Nov. 25, 1947 |
| 2,617,461 | Bach | Nov. 11, 1952 |
| 2,621,692 | Urschel et al. | Dec. 16, 1952 |
| 2,638,949 | Blevins et al. | May 19, 1953 |
| 2,749,855 | Guigas | June 12, 1956 |